May 19, 1964 S. MESSERSCHMIDT 3,133,382
APPARATUS FOR GRINDING BALLS
Filed March 23, 1961 2 Sheets-Sheet 1

INVENTOR
Sebastian Messerschmidt
BY
Kemon, Palmer, Stewart & Estabrook
ATTORNEYS May 19, 1964  S. MESSERSCHMIDT  3,133,382
APPARATUS FOR GRINDING BALLS
Filed March 23, 1961  2 Sheets-Sheet 2

INVENTOR
Sebastian Messerschmidt
BY
Kenyon, Palmer, Stewart & Estabrook
ATTORNEYS

United States Patent Office 3,133,382
Patented May 19, 1964

3,133,382
APPARATUS FOR GRINDING BALLS
Sebastian Messerschmidt, Altstadtstrasse 5,
Schweinfurt, Germany
Filed Mar. 23, 1961, Ser. No. 127,408
Claims priority, application Germany Oct. 22, 1960
21 Claims. (Cl. 51—103)

The invention relates to apparatus for grinding balls, particularly balls for ball-bearings, which are arranged in a gap between rotary bodies which carry out a relative turning movement in relation to each other and thereby impart to the balls a rotary movement about at least one of their axes.

In the known apparatus for this purpose, the balls are arranged either between the end faces of rotary bodies or between their peripheral surfaces, whereby at least one rotary body performs the actual grinding work while the other imparts to the balls a rolling movement. An objection to this mode of operation is that the rotary movement imparted to the balls is not controlled and therefore cannot be influenced but is left to chance. As a result, only polyhedrons but not round or spherical balls are produced. Owing to the inaccuracy of this manner of working, the balls introduced into the apparatus must be appreciably overdimensioned in order to prevent the required minimum diameter being surpassed in the subsequent repeated precision working. This means that a relatively thick layer must be removed in the course of the process of production which necessitates a considerable amount of working time and consumption of material. Another objection is that the life of the grinding wheels used is only very short and balls rough-worked in this manner have to be lapped several times.

The object of the invention is to avoid these objections and to produce an apparatus for grinding balls which operates so accurately that even the subsequent precision working requires only one operation.

This is attained in that apparatus for grinding balls, particularly balls for ball-bearings is devised in which, according to the invention, at least one additional or turning movement is imparted to the balls by a supplementary operation about an axis the direction of which differs from the direction of the rotary or turning movement which is imparted to the balls only by the rotary bodies bordering the gap.

An apparatus for carrying out this operation, consists of at least two rotary bodies carrying out a turning movement in relation to each other and forming between them a gap into which the balls are introduced and, while being rotated, are ground around at least one of their axes, whereby, according to the invention, the additional rotary or turning movement is effected by at least one movable friction surface in engagement with the balls at a point to turn the balls about an axis which is at an angle to the axis of rotation produced by the two gap-forming rotary bodies. Thereby the balls can be arranged either between the end faces of the rotary bodies or between the peripheral surfaces thereof.

The movement of the friction surface preferably takes place at least approximately parallel to one of the opposing generatrices or end faces of the rotary bodies.

In the preferred forms of invention, the friction surfaces for producing rotation of the balls about a second axis are formed as endless surfaces which travel around a closed path continuously in one direction. Endless surfaces for this purpose are formed as surfaces on either an endless belt or on a rotary body, as will appear hereinafter.

It also comes within the scope of the invention to construct the friction surface as an endless belt and to use as friction surface the surface parallel to the return or reversal axes of the belt and also the surface at right angles thereto.

A particularly advantageous embodiment of the invention consists in guiding the balls between the upper and lower strands or reaches of such an endless belt, whereby the belt is, as also proposed by the invention, arranged so that it projects in longitudinal direction over at least one of the rotary bodies and the balls are introduced between the reaches of the belt in their plane of movement at an angle to the direction of movement of the belt and are guided out therefrom in a similar manner.

If for carrying out the operation according to the invention, a grinding apparatus is used in which the balls are arranged between the peripheral surfaces thereof, the axes of these rotary bodies can be arranged either parallel to each other in both planes or parallel only in one plane and skewed in relation to each other in the plane perpendicular thereto.

Other advantageous features and details of the invention will become apparent from the embodiments hereinafter described by way of example with reference to the accompanying drawings in which the balls are arranged between the peripheral surfaces of the rotary bodies and these have parallel axes extending in two planes perpendicular to each other.

In these drawings:
FIG. 1 shows a grinding apparatus according to the invention in which the balls are arranged near the narrowest point between the rotary bodies, the friction surface being provided by a rotatable ring.

Figure 1:
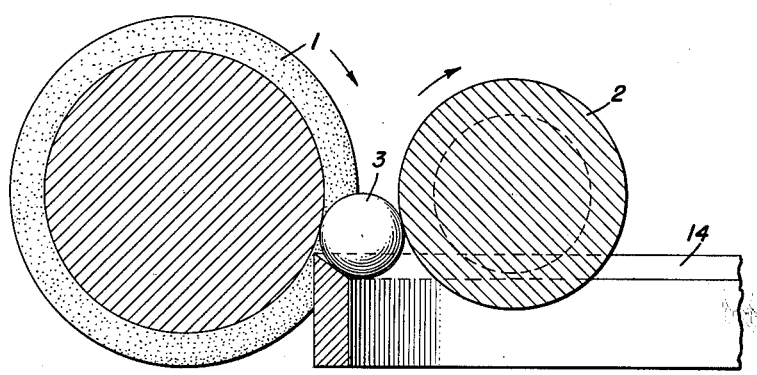

In the various figures of the drawing the two rotary bodies are cylindrical bodies shown at 1 and 2.

The basic construction of the apparatus according to the invention is illustrated in FIG. 1. There a grinding body is designated by 1 and another rotary body by 2 which imparts rotary movement to the balls 3. This last mentioned rotary body can be so constructed that it imparts to the balls not only a rotary motion about the axis perpendicular to the plane of the drawing but also about another axis. 14 designates the movable friction element having a friction surface which is movable in relation to the rotary bodies 1 and 2 and the balls 3 and produces additional turning of the balls about a different axis as explained above. If the balls are arranged as shown for example in FIG. 1, that is near the narrowest point between the rotary bodies, a single friction surface is sufficient.

Figure 3:
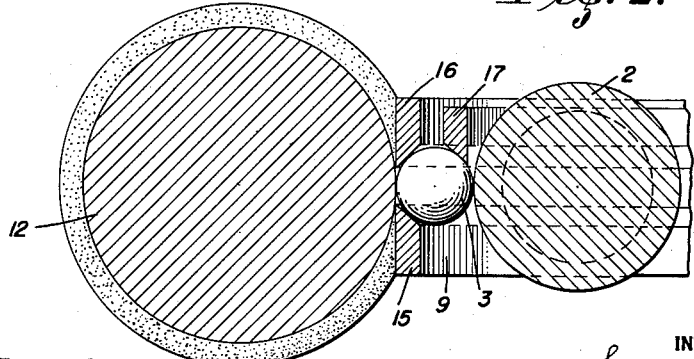
FIG. 3 shows a grinding apparatus according to the invention with balls arranged at the narrowest point between the rotary bodies and wherein the friction surfaces are provided by rotating rings.

If, however, the balls are arranged as shown in FIG. 3 at the narrowest point between the two rotary bodies, the balls must have a friction surface on two sides either perpendicular to the connecting line between the axes of the rotary bodies, as would be provided by movable friction members 15 and 16, or opposite each other on a ball diameter as would be provided by movable friction members 15 and 17.

If the friction surface is provided by a rotatable ring 14 the facing generating lines of the cooperating rotary bodies 1 and 2 are preferably in the form of arcs concentric with the ring 14. In this case the ring 14 is rotated continuously in one direction about its axis.

Figure 2:
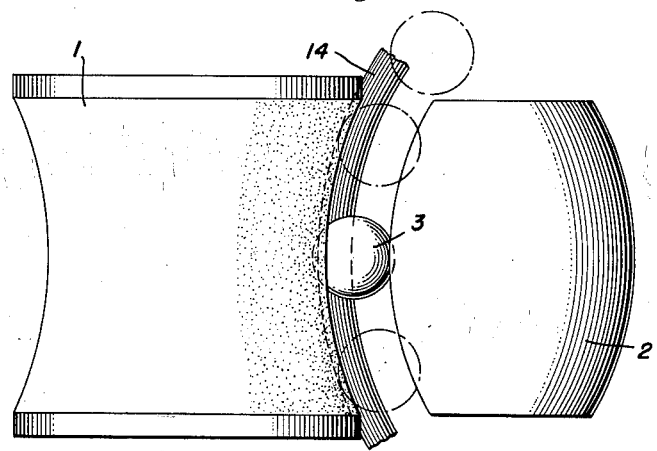
FIG. 2 is a plan view of FIG. 1.

In FIGS. 1 to 3 the rings 14, 15, 16 and 17 surround the balls 3 and the rotary body 2 which may be either the grinding body or the non-grinding body.

Figure 4:
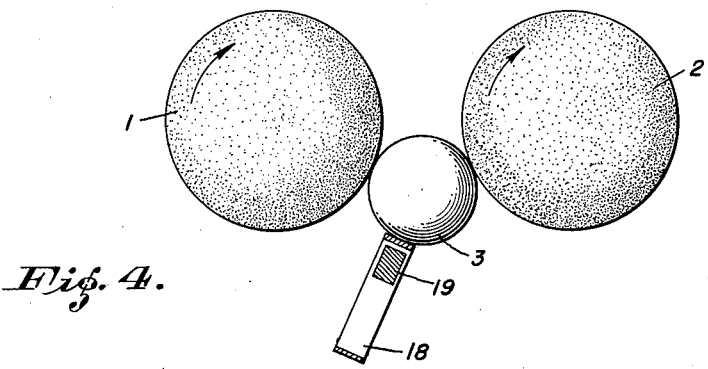
FIG. 4 shows a device in which the friction surface is constructed as an endless belt.
Figure 7:
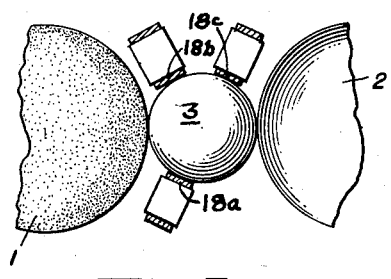
FIG. 7 shows an arrangement similar to FIG. 3 in which the friction surfaces are provided by endless belts on opposite sides of the balls.

The construction of the friction surface as an endless belt is illustrated in FIG. 4. There the endless circulating belt is designated by 18. It can be guided perpendicularly to its plane of movement for example by a stationary support 19. Instead of only one belt, several such belts 18a, 18b and 18c can be arranged to cooperate with the balls in the manner indicated for example in FIG. 7.

Figure 5:
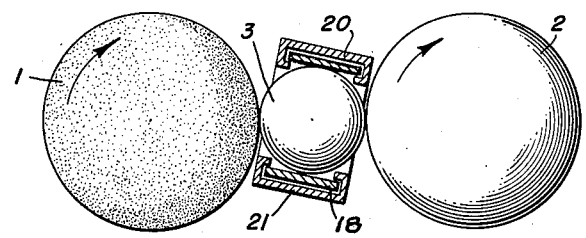
FIG. 5 shows a device similar to FIG. 4 in which the balls are guided between the upper and lower strands of an endless belt.

It is particularly advantageous to arrange belt friction surfaces in the manner shown in FIG. 5, when the friction surfaces forming the upper and lower strands or reaches of an endless belt 18 with which the balls come into contact at two diametrically opposite points. The belt may be guided on the two belt surfaces opposite the contacting surfaces by rigid supports 20 and 21 respectively, as shown in FIG. 5, when these supports can be designed to extend over the belt on both sides so that it is also laterally guided.

Figure 6:
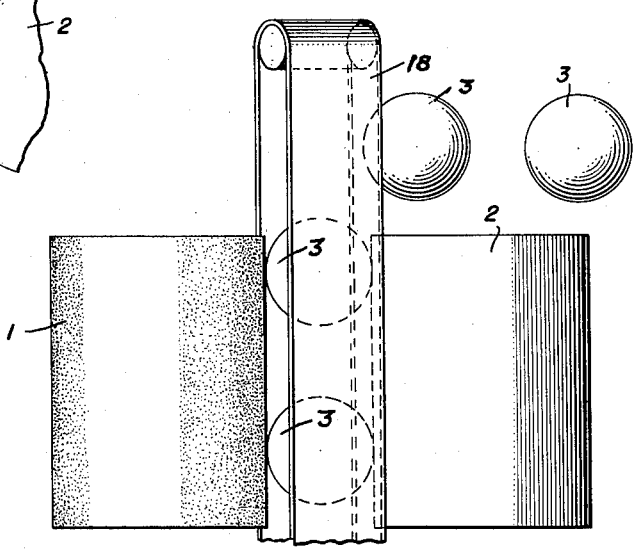
FIG. 6 is a top plan view of FIG. 5.

As can be seen from FIG. 6, the introduction and removal of the balls between the two strands of the belt can be effected at the end face of the rotary bodies 1 and 2.

In all of the arrangements described above and shown in the drawing it will be noted that the two rotary bodies 1 and 2 are mounted to rotate on parallel axes and are spaced apart to form the gap for receiving the balls 3, the adjacent surfaces of the bodies being shaped to provide a gap of uniform width from one end of the rotary bodies to the opposite end. Also, the friction surface elements for producing additional rotation of the balls about a different axis from the rotation produced by bodies 1 and 2 are arranged to guide the balls 3 lengthwise of the gap from one end of the gap to the other end. The friction surfaces producing the additional turning movement may be roughened if desired.

What I claim is:

1. Apparatus for grinding balls comprising at least two rotary bodies mounted with their rotary axes parallel with each other and spaced apart to form a gap in which the balls to be ground have contact with both rotating bodies and are rotated by said bodies about a first axis parallel with the rotary axes of said bodies, at least one of said rotary bodies being a grinding body, said rotary bodies having their adjacent surfaces shaped to provide said gap of uniform width from one end of the rotary bodies to the other end, and at least one movable friction element having a friction surface in contact with the balls for imparting an additional turning movement thereto about a second axis inclined to the first axis of turning, the friction surface on said movable element being arranged in an endless or closed path, and means for driving said friction element to move said friction surface continuously in one direction about said closed path, said movable friction element being mounted to guide the balls lengthwise of the gap between said two rotary bodies from one end of the gap to the other.

2. Apparatus according to claim 1, wherein the cooperating surfaces of said rotary bodies are formed on approximately parallel generating lines and the friction surface is movable at least approximately parallel to at least one of the facing generating lines of the rotary bodies.

3. Apparatus according to claim 1, wherein the friction surface is constructed and arranged to move in a straight line along a portion of said closed path.

4. Apparatus according to claim 1, wherein the friction surface is constructed and arranged in a circle and said movable element is mounted to rotate about the axis of said circle.

5. Apparatus according to claim 1, in which the friction surface is geometrically flat and roughened.

6. Apparatus according to claim 1, wherein the friction surface is so arranged that the balls are located near the narrowest point between the peripheral surfaces of the rotary bodies one of which effects a grinding action and their point of contact with the friction surface is at least substantially diametrically opposite the point of contact of the rotary body exerting no grinding effect.

7. Apparatus according to claim 1, wherein there are two movable friction-elements providing two endless friction surfaces arranged so that they hold the balls at the narrowest point between the peripheral surfaces of the rotary bodies, whereby the friction surfaces engage the balls at two diametrically opposite points.

8. Apparatus according to claim 7, wherein said two friction surfaces are arranged so that the balls are held at the narrowest point between the peripheral surfaces of the rotary bodies and contact the balls at two points the connecting line between which is perpendicular to the connecting line between the axes of the rotary bodies.

9. Apparatus according to claim 1, wherein there are two movable friction-elements providing two endless friction surfaces arranged so that the balls are held at the narrowest point between the peripheral surfaces of the rotary bodies one of which exerts a grinding effect and these friction surfaces contact the balls at two points the projection of which parallel to the direction of their movement in the zone of operation forms an angle of 35° with the longitudinal central plane of the grinding body, the apex of this angle being directed towards the grinding body.

10. Apparatus according to claim 1, wherein the friction surface is constructed as an endless belt.

11. Apparatus according to claim 10, wherein the friction surface is constructed as a surface parallel to the reversal axes of the belt.

12. Apparatus according to claim 10, wherein the friction surface is guided by a support.

13. Apparatus according to claim 10, wherein the belt is guided at its side edges perpendicularly to the plane of movement.

14. Apparatus according to claim 10, wherein the balls are in contact with the upper and lower strands of the belt.

15. Apparauts according to claim 10, wherein the belt projects in its direction of travel over at least one of the rotary bodies and the balls are introduced between and removed from between the two strands of the belt in their plane of movement at an angle to the direction of travel of the belt.

16. Apparatus according to claim 10, wherein the balls are in contact at two points with separate endless belts and these belts run in opposite directions.

17. Apparatus according to claim 1, wherein the friction surface is constructed as the end face of a rotating ring.

18. Apparatus according to claim 17, wherein the axis of rotation of the ring is arranged in a plane extending through the diameter of the balls and the cross-sectional surface of at least one of the rotary bodies.

19. Apparatus according to claim 17, wherein the axis of rotation of the ring extends at least substantially perpendicular to the longitudinal sectional plane of at least one of the rotary bodies and the periphery of the rotary bodies is so constructed that a free space concentric with the rotary ring is formed in the working zone.

20. Apparatus according to claim 17, wherein the rotary ring is arranged so that it surrounds the balls and the rotary body performing no grinding action.

21. Apparatus according to claim 17, wherein the rotary ring is arranged so that it surrounds the balls and the rotary body performing the grinding action.

References Cited in the file of this patent

UNITED STATES PATENTS

| | | |
|---|---|---|
| 535,794 | Grant | Mar. 12, 1895 |
| 1,531,281 | Garbin | Mar. 31, 1925 |
| 1,985,433 | Turner | Dec. 25, 1934 |
| 2,377,921 | Binns et al. | June 12, 1945 |
| 2,998,676 | Hawkins | Sept. 5, 1961 |

FOREIGN PATENTS

| | | |
|---|---|---|
| 903,541 | France | Jan. 22, 1945 |